(12) United States Patent
Manine

(10) Patent No.: US 7,474,482 B2
(45) Date of Patent: Jan. 6, 2009

(54) OPTICAL DATA READER WITH REMOVABLE LENS SYSTEM

(75) Inventor: Pierre-Marie Manine, Pibrac (FR)

(73) Assignee: Intermec IP Corp., Everett, WA (US)

( * ) Notice: Subject to any disclaimer, the term of this patent is extended or adjusted under 35 U.S.C. 154(b) by 272 days.

(21) Appl. No.: 11/407,693

(22) Filed: Apr. 19, 2006

(65) Prior Publication Data

US 2006/0262429 A1 Nov. 23, 2006

Related U.S. Application Data

(60) Provisional application No. 60/672,930, filed on Apr. 19, 2005.

(51) Int. Cl.
*G02B 7/02* (2006.01)

(52) U.S. Cl. .................. 359/828; 359/827; 359/704; 396/531

(58) Field of Classification Search .................. 359/704, 359/827, 828; 396/531
See application file for complete search history.

(56) References Cited

U.S. PATENT DOCUMENTS

| | | | | |
|---|---|---|---|---|
| 2,618,201 A | * | 11/1952 | Brohl et al. .................. | 396/531 |
| 4,281,895 A | * | 8/1981 | Mohr .......................... | 359/827 |
| 5,498,868 A | | 3/1996 | Nishikawa et al. .......... | 250/234 |
| 6,016,230 A | | 1/2000 | Nunnally et al. ............ | 359/819 |
| 6,254,262 B1 | | 7/2001 | Crunk et al. ................. | 362/544 |
| 2004/0202464 A1 | * | 10/2004 | Miyasaka et al. ............ | 396/529 |

* cited by examiner

*Primary Examiner*—Joseph Martinez
(74) *Attorney, Agent, or Firm*—Seed IP Law Group PLLC

(57) ABSTRACT

A selectively mountable optical assembly having an optics body, at least one optical element, and a mounting base. Coupling structure allows the optics body to be selectively coupled to the mounting base such that a flange on the optics body is selectively aligned with the mounting base when in an engaged position.

17 Claims, 6 Drawing Sheets

OPTICAL DATA READER WITH REMOVABLE LENS SYSTEM

CROSS-REFERENCE TO RELATED APPLICATION

This application claims the benefit under 35 U.S.C. § 119 (e) of U.S. Provisional Patent Application No. 60/672,930, filed Apr. 19, 2005.

BACKGROUND OF THE INVENTION

1. Field of the Invention

The present disclosure is directed to an optoelectronic reader and, more particularly, to a removable optical element assembly for an Optoelectronic reader.

2. Description of the Related Art

Optoelectronic readers including moving beam devices (e.g., scanners, laser scanners, and the like) and fixed beam devices (e.g., imagers, charge coupled device imagers, and the like) typically employ optical lens for focusing a reflected light onto an optoelectronic sensor. The lenses and other optical components of the optoelectronic readers are typically permanently affixed or, in some case, held together by screws, clamps, and the like. Accordingly, exchanging or removing the optoelectronic reader's optical components may require specialized equipment and tools, or complex procedures.

For example, U.S. Pat. No. 5,498,868 issued to Nishikawa et al. on Aug. 4, 1981, describes and optical data reader including a variable focus lens. The variable focus lens of the '868 patent, however, is sealed with a transparent glass diaphragm and secured by a flange. Accordingly, specialized equipment and tools are necessary to remove the variable focus lens of the '868 patent.

One method of providing a quick-change lens mount is described in U.S. Pat. No. 4,281,895 issued to Siegfried H. Mohr on Aug. 4, 1981. The '895 patent describes a projection lens with a mounting structure for facilitating rapid lens changing. The lens assembly of the '895 patent includes a lug and a complex clamping spring system to position and secure its lens. The '895 patent fails to disclose, however, at least a selectively mountable optical assembly that includes an optics body with a positioning flange extending radially, and notches sized and positioned to receive lugs from a mounting base.

The present disclosure is directed to overcome one or more of the shortcomings set forth above.

BRIEF SUMMARY OF THE INVENTION

In one aspect, the present disclosure is directed to a selectively mountable optical assembly including an optics body, at least one optical element, and a mounting base. The optics body includes a first end, a second end opposite the first end, a tubular body portion, and at least two lugs. The at least two lugs may be located proximate to the second end of the optics body and may extend radially therefrom. The optics body may also include a longitudinal passage that extends along a longitudinal axis between the first and the second ends of the optics body, and through the tubular body portion. The optics body may further include at least one optical element that may be received in the longitudinal passage of the tubular body portion.

The mounting base includes at least two notches and an interior surface. The interior surface forms an interior passageway that defines a longitudinal axis. The at least two notches of the mounting base may be sized and positioned to receive the respective at least two lugs of the optics body at a same time, when the longitudinal axes of the longitudinal passage and the interior passageway are coaxial, and when the optics body is in a first angular position about the longitudinal axis of the interior passage with respect to mounting base.

In another aspect, the present disclosure is directed to a selectively mountable optical assembly including an optics body, at least one optical element, and a mounting base. The optics body includes a first end, a second end opposite the first end, a tubular body portion, at least two coupling structures, and a radial flange. The optics body may also include a longitudinal passage that extends along a longitudinal axis between the first and the second ends of the optics body, and through the tubular body portion. The at least two coupling structures may be located proximate to the second end of the optics body.

The radial flange may extend radially from the optics body, and may include a plan view profile of a first non-circular geometrical shape having at least one major axis of symmetry. The optics body may further include at least one optical element that may be received in the longitudinal passage of the tubular body portion.

The mounting base includes a first end, a second end opposite the first end, a longitudinal passage extending along a longitudinal axis between the first and the second ends of the mounting base, and at least two coupling structures that may be placed proximate to the second end. The mounting base may further include a plan view profile of a second non-circular geometrical shape having at least one major axis of symmetry.

When the longitudinal axes of the tubular body portion and the mounting base are in a first angular position about the longitudinal axes, the longitudinal axes of the tubular body portion and the mounting base are coaxial. Additionally, in the first angular position, the coupling structure of one of the optics body or the mounting body are loosely receivable by the coupling structures of the optics body, and the longitudinal axes of the mounting body and the at least one major axis of symmetry of the flange are parallel with a respective one of the at least one major axis of symmetry of the mounting base.

When the longitudinal axes of the tubular body portion and the mounting base are in a second angular position about the longitudinal axes, the coupling structure of one of the optics body or the mounting body is securingly engaged by at least a portion of the other of the optics body and the mounting body, and the at least one major axis of symmetry of the flange is parallel with a respective one of the at least one major axis of symmetry of the mounting base.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

In the following description, certain specific details are set forth in order to provide a thorough understanding of various disclosed embodiments. One skilled in the relevant art, however, will recognize that embodiments may be practiced without one or more of these specific details, or with other methods, components, materials, etc. In other instances, well known structures associated with optoelectronic readers such as barcode readers and methods for reading machine-readable symbols such as barcode symbols area or matric code symbols and/or stacked code symbols have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Further more, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to an optical electronic reader including "a lens" includes a single lens, or two or more lenses. It should also be noted that the term "or" is generally employed in its sense including "and/or" unless the content clearly dictates otherwise.

The headings provided herein are for convenience only and do not interpret the scope or meaning of the embodiments.

Figure 1:
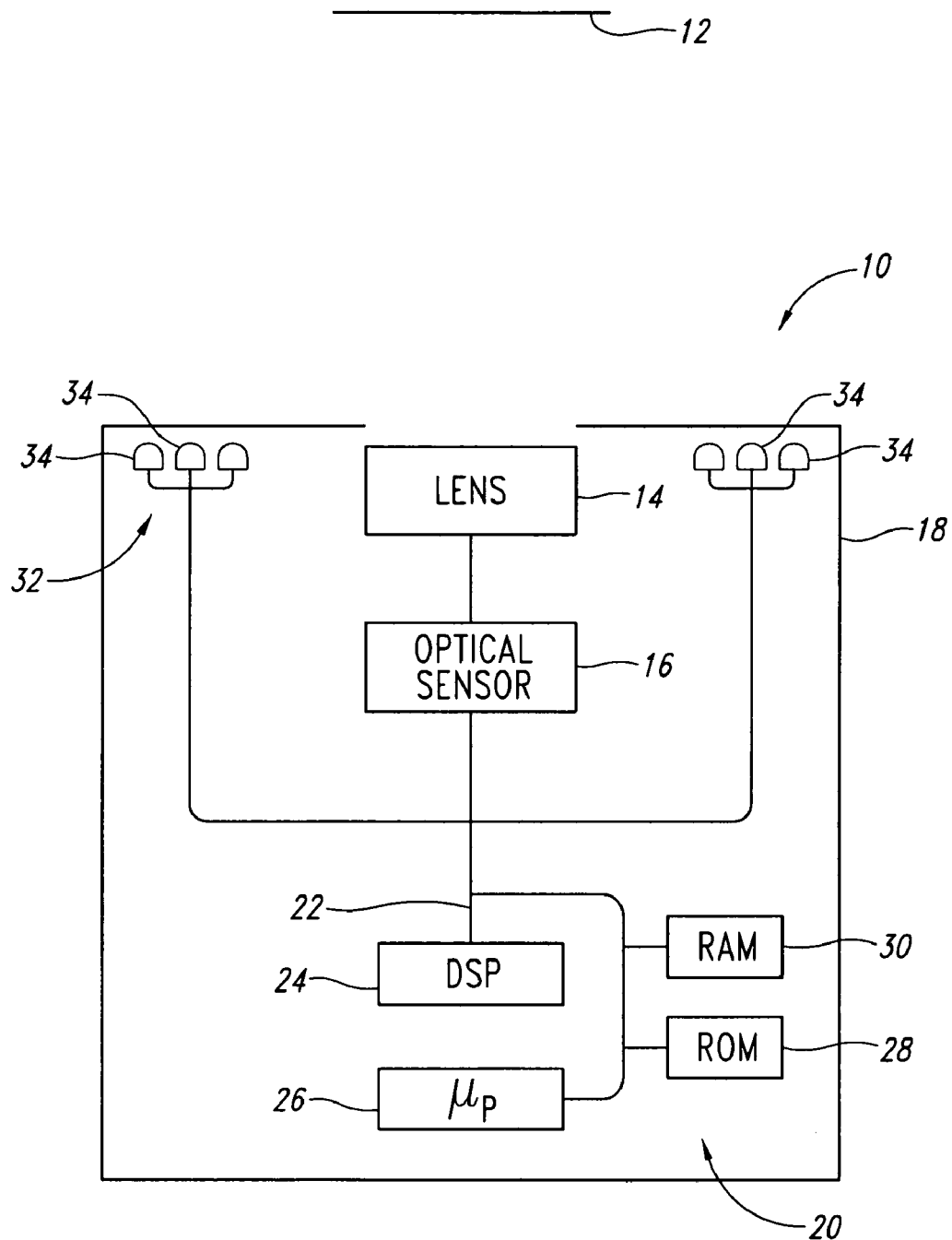
FIG. 1 is a functional block diagram of an exemplary disclosed optoelectronic reader employing a selectively mountable optical assembly.

FIG. 1 shows an exemplary embodiment of an optoelectronic reader 10 employing a selectively mountable optical assembly 14. The optoelectronic reader 10 may include a housing 18, a control subsystem 20, an optical assembly 14, and optionally an illumination subsystem 34, and may be used to read a machine-readable symbol 12. The control subsystem 20 may include one or more controllers such as microprocessor 26, digital signal processor (DSP) 24 or application-specific integrated circuit (ASIC) (not shown). The control subsystem 20 may include one or more memories, for example, random access memory (RAM) 30, and/or read-only memory (ROM) 28 coupled to the controllers by one or more busses 22. The optoelectronic reader 10 may take a handheld form and power may be supplied from portable power source including a battery, ultra-capacitor, fuel cell, and the like.

The optoelectronic device 10 may include an optoelectronic sensor 16 operable to transform an image received as light into digital data, for example electrical signals. Examples of optical sensor 16 include a one- or two-dimensional CCD array, one or more photodiodes, image sensors, and the like.

The optical assembly 14 may further include one or more optical elements positioned to receive light from the machine-readable symbol 12 and to focus an optical beam onto optical sensor 16. Examples of optical elements include, optical lenses (e.g., axicon lenses element, double convex lenses, and the like), optical waveguides (conical refracting surfaces, and the like), and the like.

The optoelectronic device 10 may include an optional illumination subsystem 32 including one or more light producing transducers, for example light emitting diodes (LED) 34 which may be operable in response to a signal from the microprocessor 26.

Figure 2:
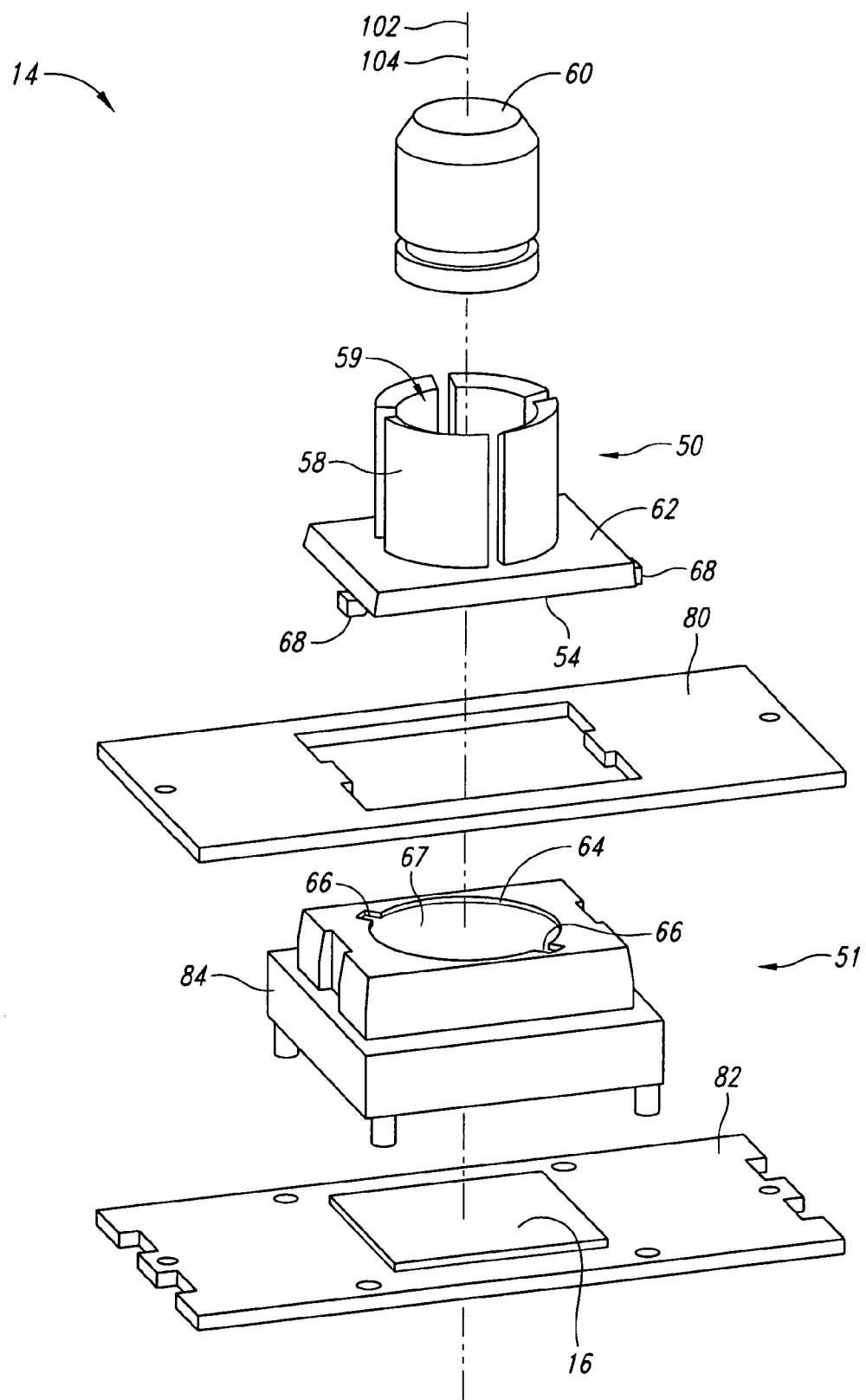
FIG. 2 is an exploded perspective pictorial representation of an exemplary disclosed selectively mountable optical assembly.
Figure 5:
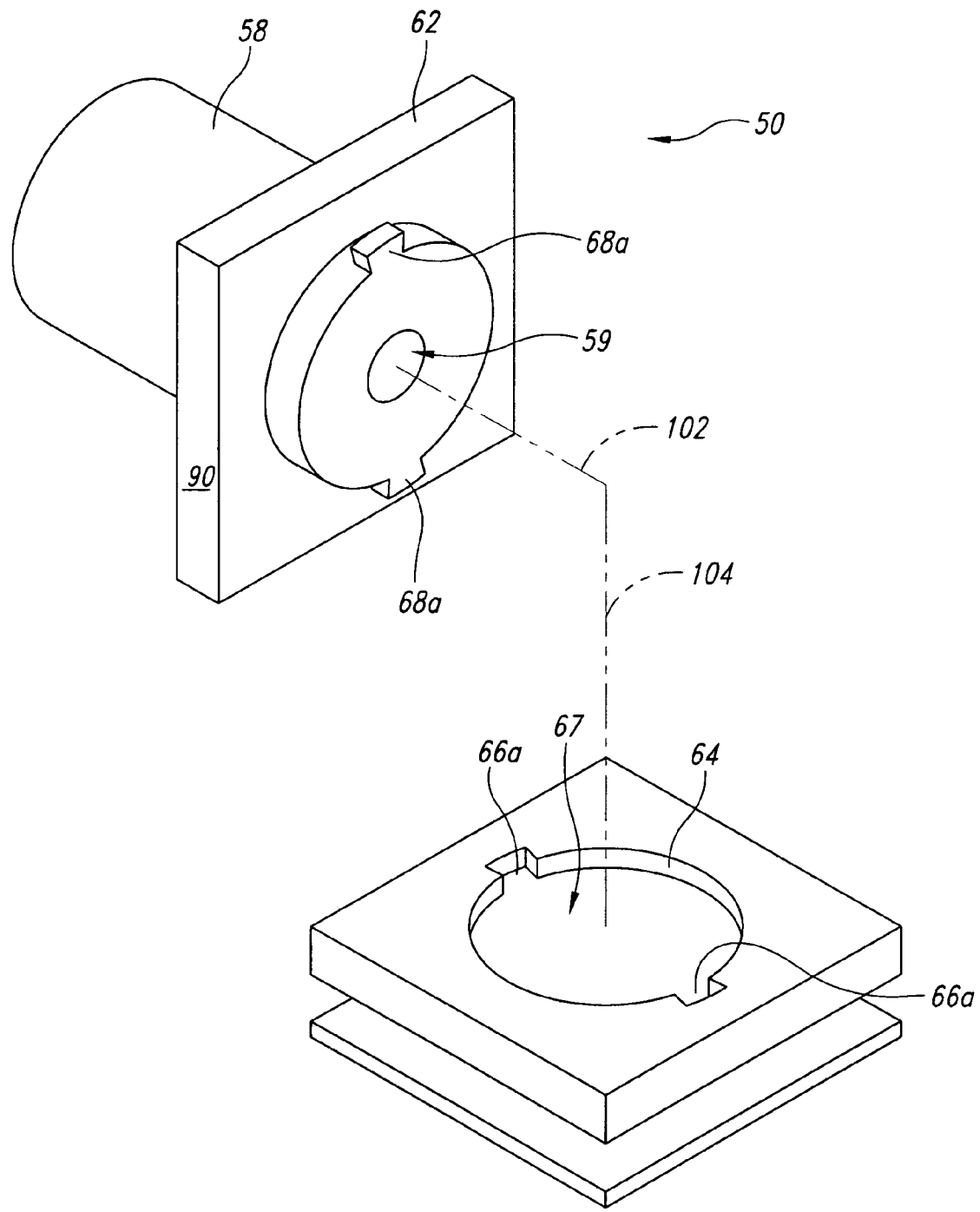
FIG. 5 is a pictorial representation of an exemplary embodiment of the disclosed selectively mountable optical assembly.

FIG. 2 shows an exploded perspective of an exemplary selectively mountable optical assembly 14. The selectively mountable optical assembly 14 may include an optics body 50, at least one optical element 60, and a mounting base 51. The optics body 50 may include a first end 52, a second end 54 opposite the first end 52, a tubular body portion 58, and at least two coupling structures 68. The at least two coupling structures 68 may take the form of lugs 68a (as shown in FIG. 5), and may be located proximate to the second end 54 of the optics body 50 and may extend radially therefrom.

The optics body 50 may also include a longitudinal passage 59 that extends along a longitudinal axis 102, between the first end 52 and the second end 54 of the optics body 50, and through the tubular body portion 58. The optics body 50 may further include at least one optical element 60 that may be received in the longitudinal passage 59 of tubular body portion 58. In an embodiment, the longitudinal passage 59 of tubular body portion 58 may have a circular cross-section. In another embodiment, the at least one optical element 60 may be selected form an optical lens. In another embodiment, the selectively mountable optical assembly 14 includes a rectangular geometric shape, the tubular body portion includes a circular cross-section and the at least one optical element is an optical lens.

Figure 3:
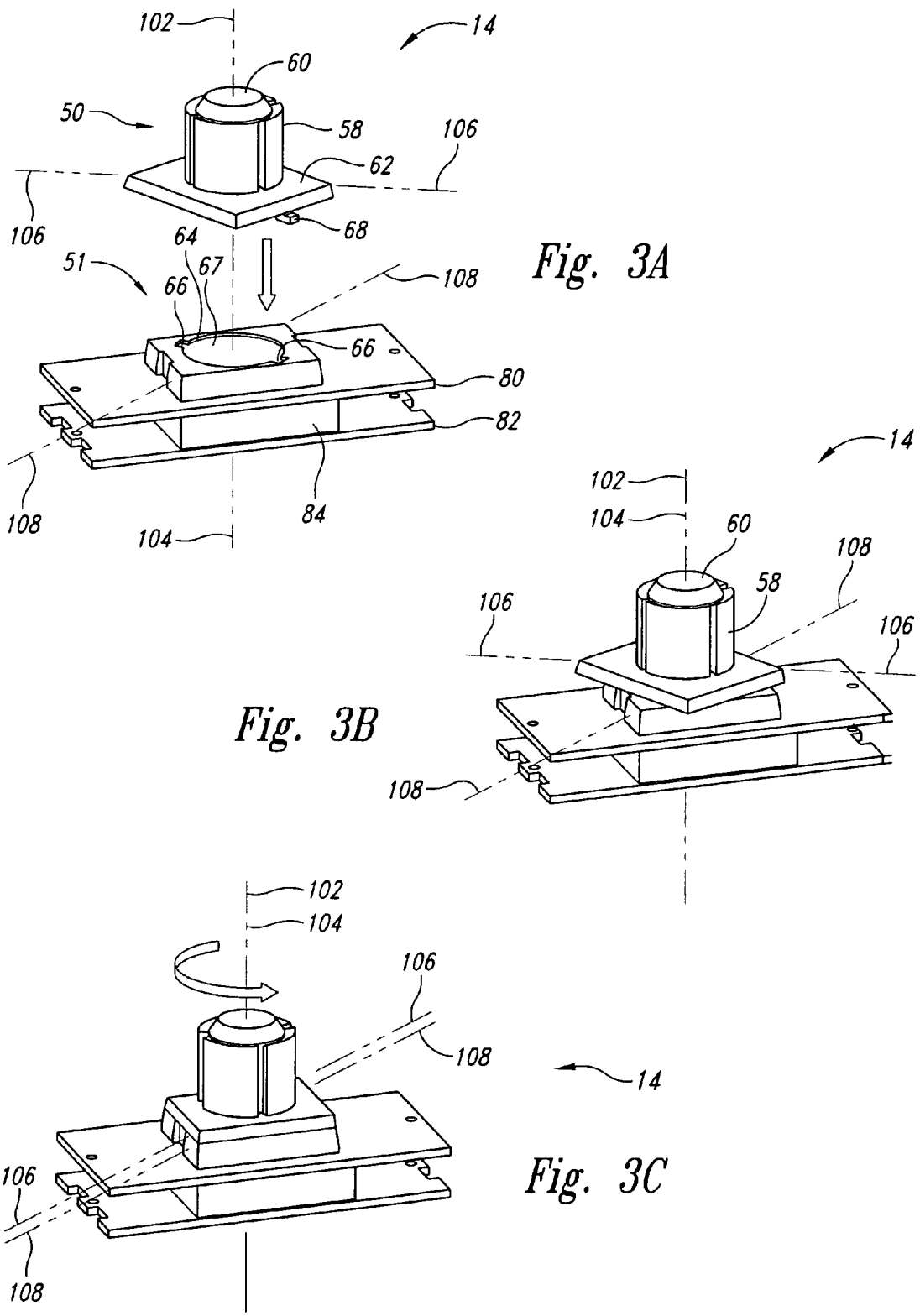
FIGS. 3A, 3B, and 3C are pictorial representations of exemplary disclosed selectively mountable optical assemblies.

The mounting base 51 may include at least two coupling structures 66 and an interior surface 64. The interior surface 64, of the mounting base 51, may form an interior passageway 67 that defines a longitudinal axis 104. In an embodiment, the at least two coupling structures 66 may take the form of notches 66a (as shown in FIG. 5), and the at least two coupling structures 68 may take the form of lugs 68a (as shown in FIG. 5). In another embodiment, the at least two notches 66a of the mounting base 51 may be sized and positioned to receive the respective at least two lugs 68a of the optics body 50, at a same time, when the longitudinal axes 102 and 104 are coaxial and the optics body 50 is in a first angular position (as shown in FIG. 3B) about the longitudinal axis 104 of the interior passage 67 with respect to mounting base 51. In a further embodiment, the at least two coupling structures 68 may take the form of two lugs 68a (as shown in FIG. 5) and the lugs 68a may be positioned diametrically opposed from one another across the tubular body portion 58.

In another embodiment, the mounting base 51 my further include at least one engagement surface (not shown) positioned to securely engage at least one of the lugs 68a when the optics body 50 is in a second angular position (shown in FIG. 3C) rotated about the longitudinal axis 102, of the interior passage 59, with respect to the first angular position (shown in FIG. 3B).

The optics body 50 may further include a radial flange 62 proximate to second end 54. The radial flange 62 may be spaced between first end 54 and the at least two coupling structures 68, and along the longitudinal axis 102 of the longitudinal passage 59.

Figure 6:
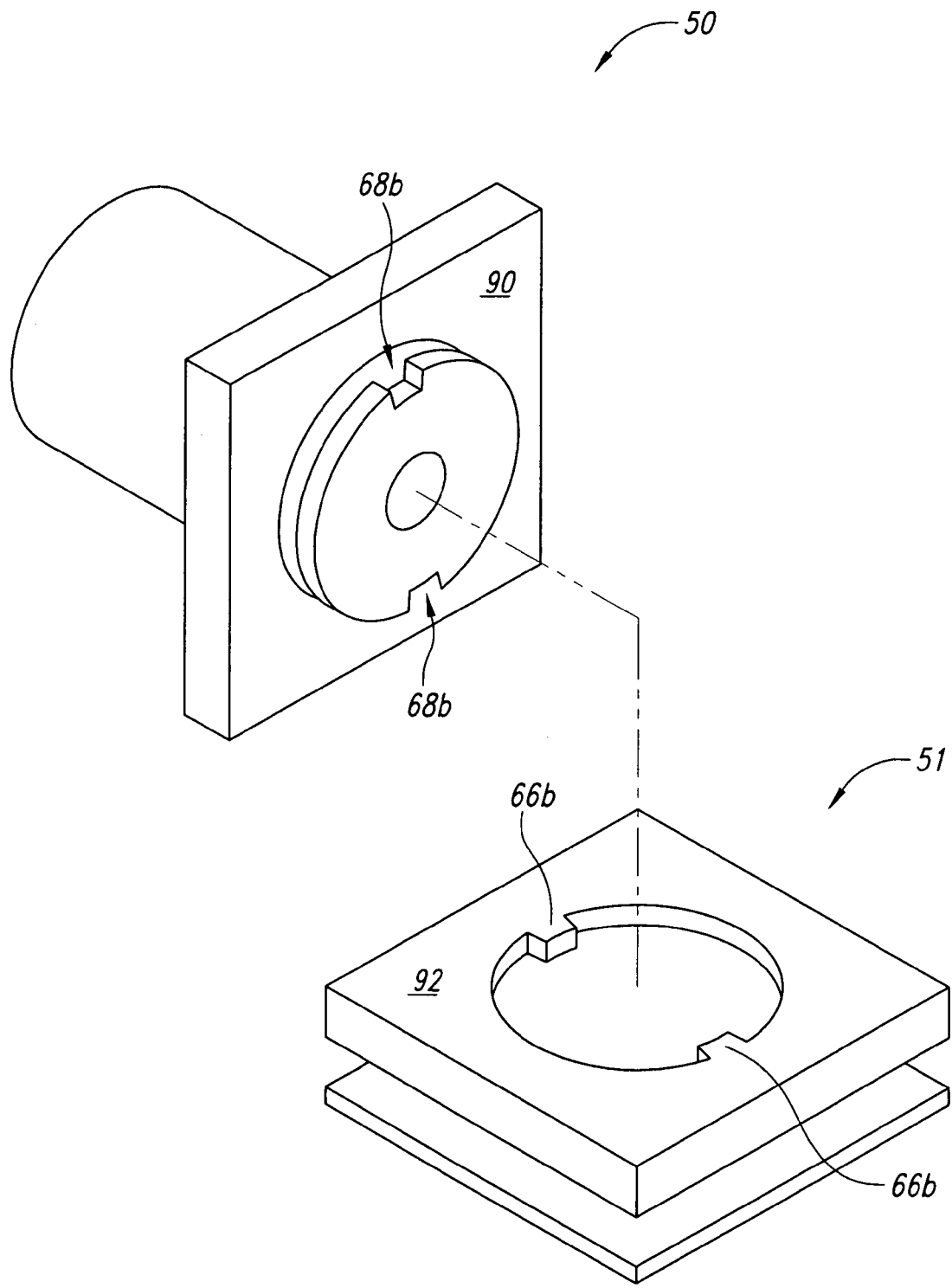
FIG. 6 is a pictorial representation of an exemplary embodiment of the disclosed selectively mountable optical assembly.

Referring to FIGS. 2 and 6, the radial flange 62 may include a plan view profile 90 of a first geometrical shape, and the mounting base 51 may include a plan view profile 92 of a second geometrical shape. The plan view profiles 90 and 92 may be selected, such that the shape of the plan view profile 90 (the first geometrical shape) of the radial flange 62, and the shape of the plan view profile 92 (the second geometrical shape) of the mounting base 51 are the same. In another embodiment, the first and the second geometrical shapes may be selected from rectangles, and in a further embodiment from squares. In another embodiment, plan view profiles 90 and 92 may be independently selected, such that plan view profile 90 (the first geometrical shape) of the radial flange 62, and plan view profile 92 (the second geometrical shape) of mounting base 51 are not the same.

Referring to FIGS. 2, 3A-3C, and 6, in yet another embodiment, plan view profiles 90 and 92 may be independently selected, such that plan view profile 90 (the first geometrical shape) of the radial flange 62, includes a profile of a first non-circular geometrical shape and having at least one major axis of symmetry 106; and plan view profile 92 (the second geometrical shape) of mounting base 51 includes a profile of a first non-circular geometrical shape and having at least one major axis of symmetry 108.

The term "registration" refers to the correspondence, adjustment of position, or alignment of shapes, colors in a figure, impressions in a design, and the like. Plan view profiles 90 and 92, of radial flange 62 and mounting base 51 respectively, may be defined to be out of registration when the optics body 50 is in a first angular position (as shown in FIG. 3B) with respect to the mounting base 51. Plan view profiles 90 an 92, of radial flange 62 and mounting base 51 respectively, may be defined to be in registration when the optics body 50 is in the second angular position (as shown in FIG. 3C) with respect to the mounting base 51. Plan view profiles 90 an 92, of radial flange 62 and mounting base 51 respectively, may be defined to be in registration when the optics body 50 is in the second angular position (as shown in FIG. 3C) with respect to the mounting base 51, and the first geometrical shape (of plan view profile 90) is in alignment with the second geometrical shape (of plan view profile 92).

Figure 4:
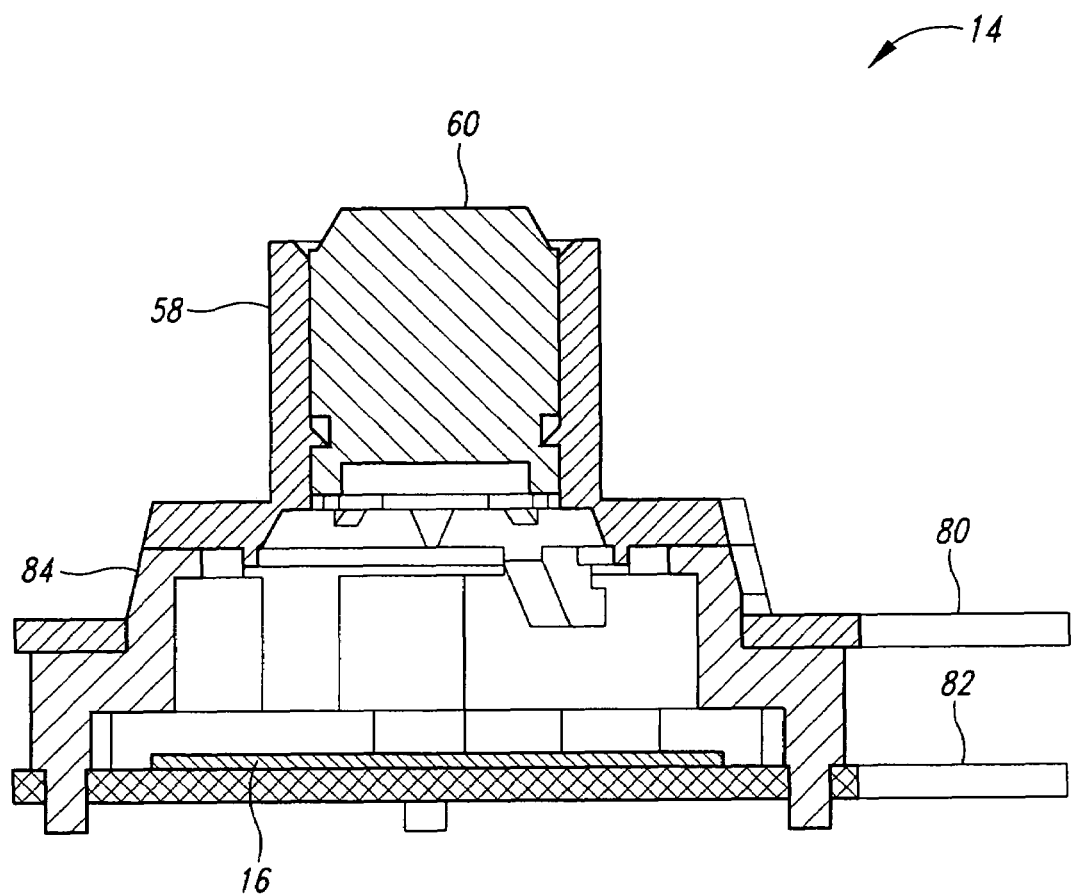
FIG. 4 is a cross-sectional pictorial representation of an exemplary disclosed selectively mountable optical assembly.

The selectively mountable optical assembly 14 may include one or more circuit boards 80 and 82 physically coupled to the mounting base 51, a chassis 84 (as shown in FIG. 4), and may further include at least one optical sensor 16 carried by a circuit board 82. In another embodiment, when the optics body 50 is in a second angular position (as shown in FIG. 3C) with respect to the mounting base 51, the longitudinal passage 59 of the tubular body 58 may be aligned with the at least one optical sensor 16.

Referring to FIGS. 3A, 3B, 3C, and 6, the radial flange 62 may have a plan view profile 90 of a first non-circular geometrical shape, having at least one major axis of symmetry 106; and the mounting base 51 may have a plan view profile 92 of a second non-circular geometrical shape, having at least one major axis of symmetry 108.

As shown in FIG. 3B, when optics body 50 is in a first angular position with respect to mounting base 51, about the longitudinal axes 102 and 104, longitudinal axes 102 and 104, of tubular body portion 58 and the mounting base 51 respectively, are coaxial; one of the at least two coupling structures 68 of optics body 50, or one of the at least two coupling structures 68 of mounting body 51, are loosely receivable by the coupling structures of the other of the optics body 50 and the mounting body 51; and the at least one major axis of symmetry 106 of the flange 62 is not parallel with a respective one of the at least one major axis of symmetry 108 of the mounting base 51.

When the optics body 50 is in a second angular position with respect to mounting base 51, about the longitudinal axes 102 and 104, the coupling structure of one of the optics body 50 or the mounting body 51 is securingly engaged by at least a portion of the other of the optics body 50 and the mounting body 51, and the at least one major axis of symmetry 102 of the flange 62 is parallel with a respective one of the at least one major axis of symmetry 108 of the mounting base 51.

Referring to FIGS. 1, 3A, 3B, 3C, and 5, in another embodiment, the at least two coupling structures 66 of the mounting base 51 may take the form of notches 66a, and the at least two coupling structures 68 of the optical body 50 may take the form of lugs 68a. The notches 66a may be sized and positioned to receive respective ones of the lugs 68a at a same time when the optics body 50 is in the first angular position with respect to mounting base 51. In another embodiment the radial flange 62 may be optionally omitted.

Referring to FIGS. 1, 3A-3C, and 6, in another embodiment, the at least two coupling structures 68, of the optical body 50, may take the form of notches 68b, and the at least two coupling structures 66, of the mounting base 51, may take the form of lugs 66b. The notches 68b may be sized and positioned to receive respective ones of the lugs 66b at a same time when the optics body 50 is in the first angular position with respect to mounting base 51. In another embodiment the radial flange 62 may be optionally omitted.

Referring to FIGS. 2 and 3B, in another embodiment, the flange 62 of the optics body 50 includes a number of edges, and the mounting body 51 includes an equal number of edges as the flange 62. In another embodiment, each of the edges of flange 62 are coextensive with the respective edges of the mounting body 51 when the optics body 50 is in the second angular position with respect to the mounting base 51.

The selectively mountable optical assembly 14 may include one or more circuit boards 80 and 82 physically coupled to the mounting base 51; and may further include at least one optical sensor 16 carried by a circuit board 82. In another embodiment, when the optics body 50 is in a second angular position (as shown in FIG. 3C) with respect to the mounting base 51, the longitudinal passage 59 of the tubular body 58 may be aligned with the at least one optical sensor 16.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/672,930, filed Apr. 19, 2005, are incorporated herein by reference, in their entirety. Aspects of the invention can be modified, if necessary, to employ systems, circuits, and concepts of the various patents, applications, and publications to provide yet further embodiments of the invention.

While the invention has been described through an illustrative discussion of specific embodiments and non-limiting examples thereof, one of ordinary skill in the art may, upon reading the specification and claims, envision other embodiments and variations which are also within the intended spirit and scope of the invention. Accordingly, the scope of the invention shall only be construed and defined by the scope of the appended claims.

What is claimed is:

1. A selectively mountable optical assembly, comprising:
   an optics body comprising a first end, a second end opposite the first end, a tubular body portion, a longitudinal passage extending along a longitudinal axis between the first and the second ends and through the tubular body portion, and at least two lugs proximate to the second end and extending radially therefrom;
   at least one optical element received in the longitudinal passage of the tubular body portion;
   a mounting base having an interior surface that forms an interior passageway with at least two notches, the interior passageway having a longitudinal axis, the at least two notches sized and positioned to receive respective ones of the at least two lugs at a same time, when the longitudinal axes are coaxial and the optics body is in a first angular position about the longitudinal axis of the interior passage with respect to mounting base;
   wherein mounting base further comprises at least one engagement surface positioned to securingly engage at least one of the lugs when the optics body is in a second angular position rotated about the longitudinal axis of the interior passage with respect to the first angular position,
   wherein the optics body farther comprises a radial flange proximate the second end; and
   wherein the radial flange has a plan view profile of a first non-circular geometrical shape and wherein the mounting base has a plan view profile of a second non-circular geometrical shape, where the first and the second non-circular geometrical shapes are the same non-circular geometric shapes.

2. The selectively mountable optical assembly of claim 1, wherein the radial flange is spaced between the first end and the at least two lugs, along the longitudinal axis of the longitudinal passage.

3. The selectively mountable optical assembly of claim 1, wherein the first and the second non-circular geometrical shapes are rectangles.

4. The selectively mountable optical assembly of claim 3, wherein the rectangles are squares.

5. The selectively mountable optical assembly of claim 1 wherein the plan view profiles of the radial flange and the mounting base are out of registration when the optics body is in the first angular position with respect to the mounting base and the plan view profiles of the radial flange and the mounting base are in registration when the optics body is in the second angular position with respect to the mounting base.

6. The selectively mountable optical assembly of claim 1 further comprising:
   a circuit board physically coupled to the mounting base; and
   at least one optical sensor carried by the circuit board;
   wherein the longitudinal passage of the tubular body portion is aligned with the at least one optical sensor when the optics body is in the second angular position with respect to the mounting base.

7. The selectively mountable optical assembly of claim 1 wherein there are two lugs and the lugs are diametrically opposed from one another across the tubular body portion.

8. The selectively mountable optical assembly of claim 1 wherein the longitudinal passage of the tubular body portion has a circular cross-section.

9. The selectively mountable optical assembly of claim 1, wherein the at least one optical element is an optical lens.

10. A selectively mountable optical assembly, comprising:
    an optics body comprising a first end, a second end opposite the first end, a tubular body portion, a longitudinal passage extending along a longitudinal axis between the first and the second ends and through the tubular body portion, at least two coupling structures proximate to the second end of the optics body, and a radial flange extending radially from the optics body, the radial flange having a plan view profile of a first non-circular geometrical shape having at least one major axis of symmetry;
    at least one optical element received in the longitudinal passage of the tubular body portion; and
    a mounting base comprising a first end, a second end opposite the first end, a longitudinal passage extending along a longitudinal axis between the first and the second ends, and at least two coupling structures proximate to the second end, wherein the mounting base has a plan view profile of a second non-circular geometrical shape having at least one major axis of symmetry;
    and where when the longitudinal axes of the tubular body portion and the mounting base are coaxial, in a first angular position about the longitudinal axes, the coupling structure of one of the optics body or the mounting body are loosely receivable by the coupling structures of the other of the optics body and the mounting body and the at least one major axis of symmetry of the flange is not parallel with a respective one of the at least one major axis of symmetry of the mounting base, and in a second angular position about the longitudinal axes, the coupling structure of one of the optics body or the mounting body is securingly engaged by at least a portion of the other of the optics body and the mounting body and the at least one major axis of symmetry of the flange is parallel with a respective one of the at least one major axis of symmetry of the mounting base.

11. The selectively mountable optical assembly of claim 10 wherein the at least two coupling structures of the mounting base are notches, and the at least two coupling structures of the optical body are lugs; and the notches are sized and positioned to receive respective ones of the lugs at a same time when the optics body is in the first angular position with respect to mounting base.

12. The selectively mountable optical assembly of claim 10 wherein the at least two coupling structures of the optical body are notches, and the at least two coupling structures of the mounting base are lugs; and the notches are sized and positioned to receive respective ones of the lugs at a same time when the optics body is in the first angular position with respect to mounting base.

13. The selectively mountable optical assembly of claim 10 wherein the plan view profiles of the radial flange and the mounting base are out of registration when the optics body is in the first angular position with respect to the mounting base and the plan view profiles of the radial flange and the mounting base are in registration when the optics body is in the second angular position with respect to the mounting base.

14. The selectively mountable optical assembly of claim 10 wherein the flange of the optics body has a number of edges and the mounting body has an equal number of edges as the flange.

15. The selectively mountable optical assembly of claim 10, wherein each of the edges of flange are coextensive with respective edges of the mounting body when the optics body is in the second angular position with respect to the mounting base.

16. The selectively mountable optical assembly of claim 10 further comprising:
   a circuit board physically coupled to the mounting base; and
   at least one optical sensor carried by the circuit board; wherein the longitudinal passage of the tubular body portion is aligned with the at least one optical sensor when the optics body is in the second angular position with respect to the mounting base.

17. The selectively mountable optical assembly of claim 10 wherein the geometric shape is a rectangle, the tubular body portion has a circular cross-section and the at least one optical element is an optical lens.

* * * * *